(12) United States Patent
Stark et al.

(10) Patent No.: US 11,194,015 B2
(45) Date of Patent: Dec. 7, 2021

(54) HIGH-POWER ELECTROMAGNETIC SOURCE, VEHICLE AND METHOD

(71) Applicant: DIEHL DEFENCE GMBH & CO. KG, Ueberlingen (DE)

(72) Inventors: Robert Stark, Bad Windsheim (DE); Martin Hertel, Lauf (DE)

(73) Assignee: Diehl Defence GmbH & Co. KG, Ueberlingen (DE)

( * ) Notice: Subject to any disclaimer, the term of this patent is extended or adjusted under 35 U.S.C. 154(b) by 224 days.

(21) Appl. No.: 16/658,276

(22) Filed: Oct. 21, 2019

(65) Prior Publication Data

US 2020/0124703 A1 Apr. 23, 2020

(30) Foreign Application Priority Data

Oct. 19, 2018 (DE) .......................... 102018008381.1

(51) Int. Cl.
| | | |
|---|---|---|
| *G01S 7/282* | (2006.01) | |
| *G01S 13/931* | (2020.01) | |
| *H01Q 3/06* | (2006.01) | |
| *H01Q 3/34* | (2006.01) | |
| *H01Q 15/14* | (2006.01) | |
| *H01Q 21/29* | (2006.01) | |
| *F41H 13/00* | (2006.01) | |
| *G01S 13/72* | (2006.01) | |

(52) U.S. Cl.
CPC .......... *G01S 7/282* (2013.01); *F41H 13/0068* (2013.01); *F41H 13/0075* (2013.01); *G01S 13/931* (2013.01); *H01Q 3/06* (2013.01); *H01Q 3/34* (2013.01); *H01Q 15/14* (2013.01); *H01Q 21/293* (2013.01); *G01S 13/72* (2013.01); *G01S 2013/93273* (2020.01)

(58) Field of Classification Search
CPC ...... F41H 13/0075; H01Q 19/062; G01S 7/38
See application file for complete search history.

(56) References Cited

U.S. PATENT DOCUMENTS

| | | | | |
|---|---|---|---|---|
| 3,657,656 A | * | 4/1972 | Cooper | .................... H01Q 3/34 |
| | | | | 375/309 |
| 4,456,912 A | * | 6/1984 | Ensley | .................... F41H 11/02 |
| | | | | 330/4 |
| 6,317,092 B1 | | 11/2001 | de Schweinitz et al. | |
| 7,522,095 B1 | | 4/2009 | Wasiewicz et al. | |
| | | | (Continued) | |

FOREIGN PATENT DOCUMENTS

EP 3217188 A1 9/2017

*Primary Examiner* — Bernarr E Gregory
(74) *Attorney, Agent, or Firm* — Laurence A. Greenberg; Werner H. Sterner; Ralph E. Locher

(57) ABSTRACT

A high-power electromagnetic source for HPEM pulses in a desired radiation direction includes at least three antennas fixed in relation to one another for pulse components, wherein at least two groups of antennas with a respective main direction are present, and a control unit for the activation and phase position of the pulse components for the superimposition for the HPEM pulse, wherein the current radiation direction of said pulse is selectable in an angle range around the main direction. A vehicle with an HPEM source has the antennas mounted in a fixed position or a support for the antennas is pivotably mounted on the vehicle. In a method for emitting the HPEM pulse, all antennas are controlled in order to select the radiation direction in the angle range of less than 360°.

15 Claims, 8 Drawing Sheets

(56) References Cited

U.S. PATENT DOCUMENTS

| | | | |
|---|---|---|---|
| 8,514,130 B1 | 8/2013 | Jensen et al. | |
| 8,576,109 B2 * | 11/2013 | Stark | F41H 13/0068 |
| | | | 342/14 |
| 8,982,010 B2 * | 3/2015 | Umerski | F41H 13/0068 |
| | | | 343/904 |
| 2004/0190214 A1 * | 9/2004 | Dommer | F41H 13/0068 |
| | | | 361/128 |
| 2007/0085618 A1 * | 4/2007 | Ganghofer | F41H 13/0068 |
| | | | 331/169 |
| 2007/0139247 A1 * | 6/2007 | Brown | G01S 7/38 |
| | | | 342/13 |
| 2015/0207226 A1 * | 7/2015 | Podgorski | H01Q 19/062 |
| | | | 342/368 |
| 2018/0058826 A1 | 3/2018 | Podgorski | |

* cited by examiner

HIGH-POWER ELECTROMAGNETIC SOURCE, VEHICLE AND METHOD

CROSS-REFERENCE TO RELATED APPLICATION

This application claims the priority, under 35 U.S.C. § 119, of German patent application DE 10 2018 008 381.1, filed Oct. 19, 2018; the prior application is herewith incorporated by reference in its entirety.

BACKGROUND OF THE INVENTION

Field of the Invention

The invention relates to an HPEM (high-power electromagnetic) source for emitting an HPEM pulse in a desired radiation direction, a vehicle with an HPEM source and a method for emitting an HPEM pulse in a desired radiation direction.

A 360° coverage with HPEM sources through the use of a single, omnidirectional dipole antenna or a strongly directional HPEM antenna (for example a horn antenna) or an HPEM antenna array is known. In the two latter cases, a mechanical/electrical turntable is required for the alignment of the HPEM antenna/antenna array with the target, for target tracking and for the implementation of a 360° coverage with a correspondingly required power/range. In the case of agile and fast-flying targets, particularly at close range, a correspondingly fast "mechanical" pivoting onto the target and an agile target tracking with high torques are required.

The range is very limited due to the limited power of an individual HPEM resonator/dipole antenna. A single dipole with an omnidirectional radiation pattern (dipole pattern) of the type hitherto available for a 360° coverage is therefore suitable to a very limited extent only, or is not at all suitable, in terms of the required effective ranges. Longer-range horn antennas or antenna arrays have a strong directional pattern and are essentially focused on a main radiation direction along the normal of the antenna aperture/area into a half-space. In order to implement a 360° coverage with antenna systems of this type, the horn antenna or antenna array is integrated onto a corresponding mechanical/electrical turntable. With a total weight of the HPEM antenna or HPEM system in the neighborhood of several hundred kilograms and required rotation rates of up to several tens of degrees per second or more, this imposes extremely stringent requirements on the turntable and the entire system due to the required high torques and accelerations. For stationary or remote applications (for example on a sufficiently stable trailer), with sufficient availability of installation area/space and correspondingly high possible permitted total weight, a 360° coverage with a corresponding turntable can be readily implemented, even if platforms of this type are normally very complex and costly. In addition, turntables of this type must therefore be protected and toughened against the influence of HPEM pulses, which also requires a certain outlay.

SUMMARY OF THE INVENTION

It is accordingly an object of the invention to provide an HPEM source which overcomes a variety of disadvantages of the heretofore-known devices and methods of this general type and which improve the use and usefulness of HPEM.

With the foregoing and other objects in view there is provided, in accordance with the invention, a high-power electromagnetic (HPEM) source for emitting an HPEM pulse in a given radiation direction. The HPEM source comprising:

at least three antennas fitted at fixed positions relative to one another and each configured to emit a respective pulse component;

at least two of said antennas being combined in each case into a group, forming at least two groups of antennas which differ from one another in terms of at least one antenna;

each of said groups of antennas having one main direction assigned thereto, and said antennas being configured to define at least two different main directions; and a control unit configured to control said antennas in terms of an activation of a phase position of respective pulse components thereof in such a way that the pulse components of said antennas are superimposed on one another in an HPEM pulse for at least one of said groups, wherein a current radiation direction of the HPEM pulse is selectable in a specific angle range around the main direction, with the specific angle range being less than 360°.

In other words, the objects of the invention are achieved by an HPEM (High-Power Electromagnetic) source, as claimed, for the emission of an HPEM pulse in a desired radiation direction. Preferred or advantageous embodiments of the invention and other inventive categories are set out in the further claims, the following description and the attached figures.

The source according to the invention contains at least three antennas. Each of the antennas is used for the respective emission of a pulse component, i.e. a component of the HPEM pulse which is to be generated through superimposition of the pulse components. The antennas are fitted at a fixed position relative to one another, in particular are mounted in a fixed position or immovably on a support structure. At least two of the antennas are combined in each case into a group. At least two groups of antennas are present, wherein the two groups differ from one another in terms of at least one antenna. In particular, the groups have no antenna or only one antenna, in particular not all antennas, in common. One main direction is assigned to each of the groups. At least two different main directions are present in the source. In particular, all main directions of all groups are different, i.e. different on a pair-by-pair basis.

The source furthermore contains a control unit. Said control unit is configured or designed, for example through hardwiring or programming, to control the antennas in terms of the activation of the phase position of their respective pulse component in such a way that the pulse components of the antennas are superimposed on one another for the HPEM pulse for at least one of the groups, wherein the current radiation direction of said pulse is selectable in a specific angle range around the main direction, wherein the angle range is less than 360°. The antennas can also be controlled in such a way that two or more HPEM pulses from, in particular, different groups/antennas are radiated.

In particular, the source has 3, 4 or 8 groups. In particular, 3, 4, 5, 6 or 7 antennas are provided for each group. The number of antennas may differ for individual groups, i.e. not all groups need to have the same number of antennas.

The control unit is designed, in particular, in such a way that only one selected group is ever active, i.e. contains at least one antenna which is controlled by an active antenna signal. In particular, antennas from two, three or more groups are also controlled in order to generate a stronger total pulse or two or more separate total pulses. In particular, at least two or more or all antennas are actively controlled within one group. The control of the "activation" of an antenna means either connecting the antenna to ground, operating it at no load (both entail non-activation) or supplying it with a transmit signal having an amplitude greater than zero, thereby also influencing the signal amplitude. Non-activated antennas and antennas kept at no load can therefore support the beam formation (formation of the HPEM pulse) as "passive reflectors".

The angle range has, in particular, a size of 360° divided by the number of groups. In particular, the angle range is increased on this basis by an overlap with the angled ranges of other groups of, in particular, 5%, 10%, 15%, 20%, 25%, 30%, 40% or 50% A of its size.

The invention is based on the realization that HPEM protection concepts are intended to be implemented for mobile use, for example, on vehicles with limited installation space, limited possible total weight and correspondingly stringent requirements for the range and integration capability of the system.

According to the invention, an amplification, alignment, focusing and tracking of HPEM beams/pulses with implementation of a 360° coverage is achieved without the use of a complex turntable. A weight-saving and space-saving, unobtrusive and surface-compliant integration of HPEM technology and antennas on mobile platforms for the implementation of an all-round protection at very close range is enabled.

The pulse components or the HPEM pulse has, in particular, a DS (damped sinusoidal) pattern or waveform. An HPEM DS directional antenna system is thus provided according to the invention. The antennas are, in particular, resonator antennas/dipole antennas/monopole antennas/antenna rods/stubs.

During the operation of the HPEM source, different pulse shapes (DS, UWB Ultra-Wide Band, WB Wide Band, narrowband), different antenna designs (monopole, dipole, rod, etc.) and the combination of individual antennas/antenna groups are possible. The main direction or main beam direction (forwards/backwards) is dependent on the phase position/synchronization and distance of the antenna rods/resonators in relation to one another. The directional pattern is dependent on the design, adjustment and time control of the activation and phase position. An effective antenna length may be $l \approx \lambda/4$, $\lambda/2$, $\lambda 5/8$, etc. (optimized for the desired radiation behavior). With regard to the distances between the antennas, an even or uneven distribution is possible. Different geometric arrangements and/or groupings are possible.

The excitation, radiation and directional pattern of the antennas or groups and therefore the HPEM source are dependent on phase positions, frequency, distance between the antennas and the time control of the dipoles/antennas/rods.

A directional radiation of HPEM pulses can be performed by means of an in-phase control of antenna rows/groups. Beam tracking is thus possible through simple switchover between antenna rows/groups.

In particular, the HPEM source therefore contains no horn structures for the beam formation, but instead only the antennas in the form of the resonator rods, etc. Only a metal ground plane, in particular in the form of a support, could be present.

In one preferred embodiment, all antennas are arranged in a common plane. Antennas with a longitudinal extension (rods, stubs, etc.) are, in particular aligned perpendicular to the plane. Particularly for radiation directions parallel to the plane, necessary phase relationships, etc., between individual antennas are simply definable for the achievement of a desired pulse characteristic (shape, range).

In one preferred embodiment, for at least one of the groups, all antennas of the group are arranged along a straight line, wherein the straight line is the main direction. The necessary phase relationships, etc., between individual antennas are particularly simply definable here for the achievement of the desired pulse characteristic (shape, range). In the case of four antennas located in a row, the following relationships, for example, can be implemented: only one outer antenna is actively supplied with a signal, while the remaining antennas are kept at no load in order to emit a pulse in one main direction only. Alternatively, the antennas are operated in series with phases of 0°, 90°, 90° and 0° in order to emit counter-running pulses symmetrically in the main direction. Alternatively, the antennas are operated with 0°, 90°, 180° and 270° in order to emit an amplified pulse to one side in the main direction.

In one preferred variant of this embodiment, at least two groups as just described (straight-line arrangement) are present. At least two of the respective straight lines are different diameter lines of an imaginary circle. The antennas of a respective group are distributed along the straight lines in relation to the circle on one radius or on the entire diameter. The corresponding straight lines of the diameter lines all intersect at the center of the circle and run through it. In particular, an antenna does and does not exist at the center of the circle. An antenna existing there is, in particular, common to two or more groups. A 360° coverage can be particularly simply implemented through corresponding circular or radial arrangements of antennas or groups.

In one preferred embodiment, for at least one of the groups, all antennas of the group are arranged within a circle segment with an aperture angle no greater than 180°. An antenna arrangement of this type can be combined, in particular, with the above-mentioned diameter or radius arrangement of the sources. In particular, sufficient circle segments are provided to form a 360° circle in total. In particular, all circle segments are of the same size. Overlaps are also possible. For example, three 120° segments (if necessary with overlap, i.e., for example, also 130°, 140°, 150° per segment) can form a full circle. An all-round coverage can thus be particularly simply implemented.

In one preferred embodiment, the antennas are arranged exclusively along two straight lines which represent the limiting radii of the circle segment. The corresponding circle segment is thus demarcated by two limiting antenna lines or straight lines. Particularly simple phase relationships between the antennas can therefore again be found in order to pivot the radiation direction within the circle segment.

In one preferred embodiment, for at least one of the groups, three or four or more or all respectively adjacent antennas of the group have the same distances between them. This applies, in particular, to antennas on the aforementioned straight lines. In this case, the antennas are then distributed equidistantly along the straight lines. The determination of phase relationships between individual antennas for the achievement of desired patterns of an HPEM pulse is particularly simple here also.

In one preferred embodiment, the control unit is configured to keep at least one of the antennas operating at no load as a passive reflector antenna. Due to the no-load operation of an antenna, said antenna acts as a reflector and can thus be used for the particularly effective beam formation of the HPEM and pulse.

In one preferred embodiment, the HPEM source contains a support. All antennas are then mounted in a fixed position on the support. The support is pivotable in relation to a foundation within a pivot range of less than 360°. The controller is configured to control a current pivot angle of the support within the pivot range in relation to the foundation. Due to the support, the fixed position of the antennas relative to one another is secured. The support can thus be designed, in particular, as a turntable for the foundation, for example a vehicle body. Since the radiation direction of the antenna arrangement is in any case already purely electronically modifiable, i.e. through modified control of the antennas, the pivot range can be designed as less than 360° without having to forego all-round protection.

In one preferred variant of this embodiment, the pivot angle is half of the greatest of the angle ranges. This results in a particularly favourable combination of mechanical and electronic pivoting of the radiation direction. Here also, the pivot angle can alternatively also be designed as somewhat greater, i.e., in particular, as explained above, plus 5%-50% of the angle range.

In one preferred variant of this embodiment, the support has a basic shape of an N-sided figure or a star with N points, in each case where N>2, or a circle segment. Corresponding shapes are particularly suitable for efficiently accommodating specific antenna arrangements thereon, for example the aforementioned circle segments with distribution of the antennas on the limiting radii.

With the above and other objects in view there is also provided, in accordance with the invention, a vehicle which carries one or more HPEM sources with the antennas mounted in fixed position on the vehicle. That is, certain objects of the invention are also achieved by the vehicle, as claimed, with at least one HPEM source without a support, wherein the antennas are mounted in a fixed position on the vehicle. The vehicle and at least some of its embodiments and the respective advantages have already been explained in the foregoing with the HPEM source according to the invention.

Further objects of the invention are also achieved by a vehicle, as claimed, with at least one HPEM source with a support, wherein the vehicle forms the foundation and the support is pivotally mounted on the vehicle. The vehicle and at least some of its embodiments and the respective advantages have already been explained accordingly in connection with the HPEM source according to the invention, in particular the pivoting in relation to the vehicle as the foundation.

In one preferred embodiment, at least two HPEM sources are provided on the vehicle and the main directions, including the angle ranges, cover only a respective total angle of less than 360° in the case of each of the sources. In particular, they cover a total angle of 360° divided by the number of sources. The overlap of between 5% and 50% repeatedly specified above is possibly provided here once more. Each of the HPEM sources thus provides the coverage of a specific segment of the vehicle environment. Each of the sources can thus be designed more simply, since it only has to protect a small total angle and does not have to offer any all-round protection.

With the above and other objects in view there is also provided, in accordance with the invention, a method for emitting a high-power electromagnetic (HPEM) pulse in a desired radiation direction, the method comprising:

providing at least three antennas fitted in a fixed position relative to one another and each configured for emitting a respective pulse component;

combining at least two of the antennas each into a group, and providing at least two groups of antennas which differ from one another in terms of at least one antenna;

assigning to each of the groups one main direction and thereby providing at least two different main directions; and controlling all antennas in terms of activation and phase position of the respective pulse component such that, for one of the groups, the pulse components of the antennas are superimposed on one another for the HPEM pulse, wherein the current radiation direction of said pulse is selected in a specific angle range around the main direction, wherein the angle range is less than 360°.

In other words, various objects of the invention are also achieved by the claimed method for the emission of an HPEM pulse in a desired radiation direction. In the method, at least three antennas fitted in a fixed position relative to one another are provided for the respective emission of a pulse component. At least two of the antennas are combined in each case into a group, and at least two groups of antennas are provided which differ from one another in terms of at least one antenna. One main direction is assigned to each of the groups and at least two different main directions are provided. All antennas are controlled in terms of the activation and phase position of their respective pulse component in such a way that the pulse components of the antennas are superimposed on one another for the HPEM pulse, wherein the current radiation direction of said pulse is selected in a specific angle range around the main direction, wherein the angle range is less than 360°.

The method and at least some of its embodiments and the respective advantages have already been explained accordingly in connection with the HPEM source and the vehicle according to the invention.

The invention is based on the following realizations, observations and considerations, and also has the following embodiments. The embodiments are referred to in some instances for the sake of simplicity as "the invention." Here, the embodiments may also contain parts or combinations of the afore-mentioned embodiments or may correspond to them and/or may possibly also include hitherto unmentioned embodiments.

The invention is based on the fundamental notion of positioning a number (N>=2) of HPEM DS resonator antennas/dipole antennas/monopole antennas/antenna rods in succession in a preferred direction in a row or line. This row/line preferably forms the desired main radiation direction of the HPEM radiation/pulses. The individual resonators/antennas are operated in each case in relation to one another with a fixed or controllable phase relationship in relation to one another. The phase relationships of the radiated pulses/waves of the individual resonators in relation to one another are selected in such a way as to provide the main radiation direction along the individual resonators arranged in a row. Depending on the phase relationships of the pulses/waves on the individual resonators and the distances between the resonators along the line, the main radiation direction is provided along the geometric line along the row of resonators in a forward direction or backward direction.

Different embodiments of the control of the individual resonators or resonator groups for different phase relationships between the pulses/antennas are possible. One example of the phase relationships between them: 0, 90, 180, 270 degrees enables the focusing of the radiation in a forward direction ("forwards"); a phase relationship of 270, 180, 90, 0 degrees enables a focusing of the radiation in a backward direction ("backwards"). The resonators and antennas can be arranged and controlled differently for the implementation of a 360-degree coverage. Circular or star-shaped arrangements, for example, or totally different geometric and functionally appropriate arrangements, e.g. around the central point/center of a ground plane or of the object to be protected (e.g. vehicle) are therefore also possible.

As well as the geometric arrangement, especially the phase relationships to be implemented between the individual antennas/antenna rods/resonators/stubs, or the radiated pulses in relation to one another, are essential for the directional radiation in order to guarantee an amplified, directional radiation in the required direction. Through the phase-delayed, time-controlled/deferred, serial control of the individual antenna rods which are located in a row, the HPEM beam can be focused in one direction. Depending on the distance between the individual antenna rods, the correspondingly phase-delayed resonators are controlled in such a way that the wave fronts are structurally superimposed on one another essentially in the desired direction (main radiation direction along an "antenna row"). Through suitable phase control of the individual antennas, the HPEM beam can be directed or focused onto the target in the direction of the main radiation direction. By changing the reciprocal phase relationships in a row and/or by activating further individual resonators/antenna rods or different or further rows or groups or subgroups of resonators or antennas/antenna rods, the HPEM beam can be spatially distributed over a greater spatial angle or can be spatially pivoted in a targeted manner onto and can track the target. Non-activated resonators or antenna rods can be partially used in an appropriate manner as "reflectors" for the beam formation. Due to the spatial effect of the HPEM pulses, no very precise allocation of the target is required. This is dependent above all on the directivity of the resonator groups/resonator configuration and also on the waveband that is used. Through the targeted temporal, phase-related electrical control of individual antenna rods/antenna resonators or antenna groups, a 360-degree all-round protection can thus be implemented for HPEM in the case of an antenna system installed in a fixed position without the need for a turntable for this purpose. Due to the simplicity of the system concept without the need for an extremely powerful and sensitive turntable, a simple integration on mobile platforms, e.g. vehicles, is also possible. At the same time, the system can also be integrated into the support platform or adapted to the surface shape in a highly space-saving and unobtrusive manner. The use of an additional "simple" turntable to support the tracking and increase the target accuracy is similarly possible (e.g. turntable with a considerably slower rotation rate, severely restricted rotating angle range and significantly lower loading through more favourable weight distribution, e.g. by separating the HPEM resonator antennas from the high-voltage generators). The rough tracking of the HPEM beam can then be performed electronically by switching over to the corresponding resonator rows/antenna groups, whereas the fine adjustment of the target tracking is performed via the mechanical/electrical component of the turntable. Both are also possible vice versa and require a precise alignment of the different coverage areas in relation to the electronic and mechanical components.

The use of this principle in subsegments, distributed on the support platform, is also possible for the implementation of the desired angle coverage up to 360 degrees. If required, specific angle ranges can additionally be left out. The upward coverage can be ensured by selecting suitable antenna configurations and angle setting (elevation) or through the use of additional systems.

The invention provides an entirely electronically controlled, delay-free alignment/tracking of the HPEM antenna or radiation pattern onto the target and implementation of a 360-degree coverage. The alignment/tracking can be performed purely electronically without the use of mechanically moving parts or a turntable. The tracking is performed more or less at the speed of light. Only the signal transit times on the control lines and the temporal jitter/delay in the switching behavior of the electronic/electrical components can be regarded as time delay. No mechanically moving parts and therefore no movement of extremely heavy masses (several hundred kg) with correspondingly high torques are required. Combined mechanical/electronic/electrical forms are also possible (e.g. through the addition of electronic pivoting with a mechanical pivoting component by means of a simple turntable with a very limited pivot range, e.g. 10 degrees or 90 degrees (non-limiting)). Through the combination of electronic and mechanical/electrical pivoting, the pivoting of the HPEM beam and the target tracking can be implemented with higher precision and greater efficiency. The operation of a plurality of resonators/antennas/rods in a row with a corresponding phase shift enables the amplification and alignment of the HPEM beam with the target. More or less any individual/plurality of resonators/antennas, antenna rows or antenna groups can furthermore be appropriately combined with one another and operated in order to adapt the radiation direction, focusing, aperture angle and efficiency/range according to requirements. This is also possible during operation.

The invention or the method enables the integration of HPEM systems on mobile platforms with simultaneous implementation of greater ranges and a 360-degree coverage.

A mechanical component for rotating the system (radiation direction) is not required or can be restricted, in combination with the electronic rotation/tracking, to a significantly smaller angle range, e.g. one or more subsegments/angle segments (angle between the individual "serial" antenna/resonator arrangements/groupings). The requirements (rotation angle rate, torque, permitted total weight, etc.) for a turntable can be substantially reduced as a result.

According to the invention, a method and system are provided for the alignment, focusing and tracking of HPEM beams/pulses through serial-phase-related operation of a plurality of HPEM resonators/antennas/antenna rods/antenna groups for the implementation of a totally electronically controlled 360-degree coverage without the need for a turntable. A 360-degree coverage at more or less "the speed of light" becomes possible with a simultaneous increase in range/performance and HPEM integration capability and HPEM protection for different, even smaller and mobile, platforms, e.g.: vehicles on land, air and sea. Control and adaptation of power, range, direction, aperture angle or effective area through the combination and control of different resonators/antennas/rods are possible, even during operation. A combination of electronically controlled and mechanical alignment, focusing and tracking is achieved in order to reduce the requirements for the turntable and increase the integration capability of HPEM antennas and systems in mobile platforms.

Specific possible applications are: HPEM system, stationary or on a trailer for various applications (e.g. for counter-UAS (Unmanned Aerial Systems) as vehicle protection, C-UAS field camp protection, etc.); HPEM system for land application, integrated on a vehicle for self-protection for various applications (e.g. counter-UAS, C-IED (Counter-Improvised Explosive Devices), convoy protection, etc.); mobile HPEM system for air and sea applications, integrated on a vehicle, drone or ship for self-protection for various applications (e.g. Counter-UAS, C-IED, etc.).

Other features which are considered as characteristic for the invention are set forth in the appended claims.

Although the invention is illustrated and described herein as embodied in HPEM source, vehicle and method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
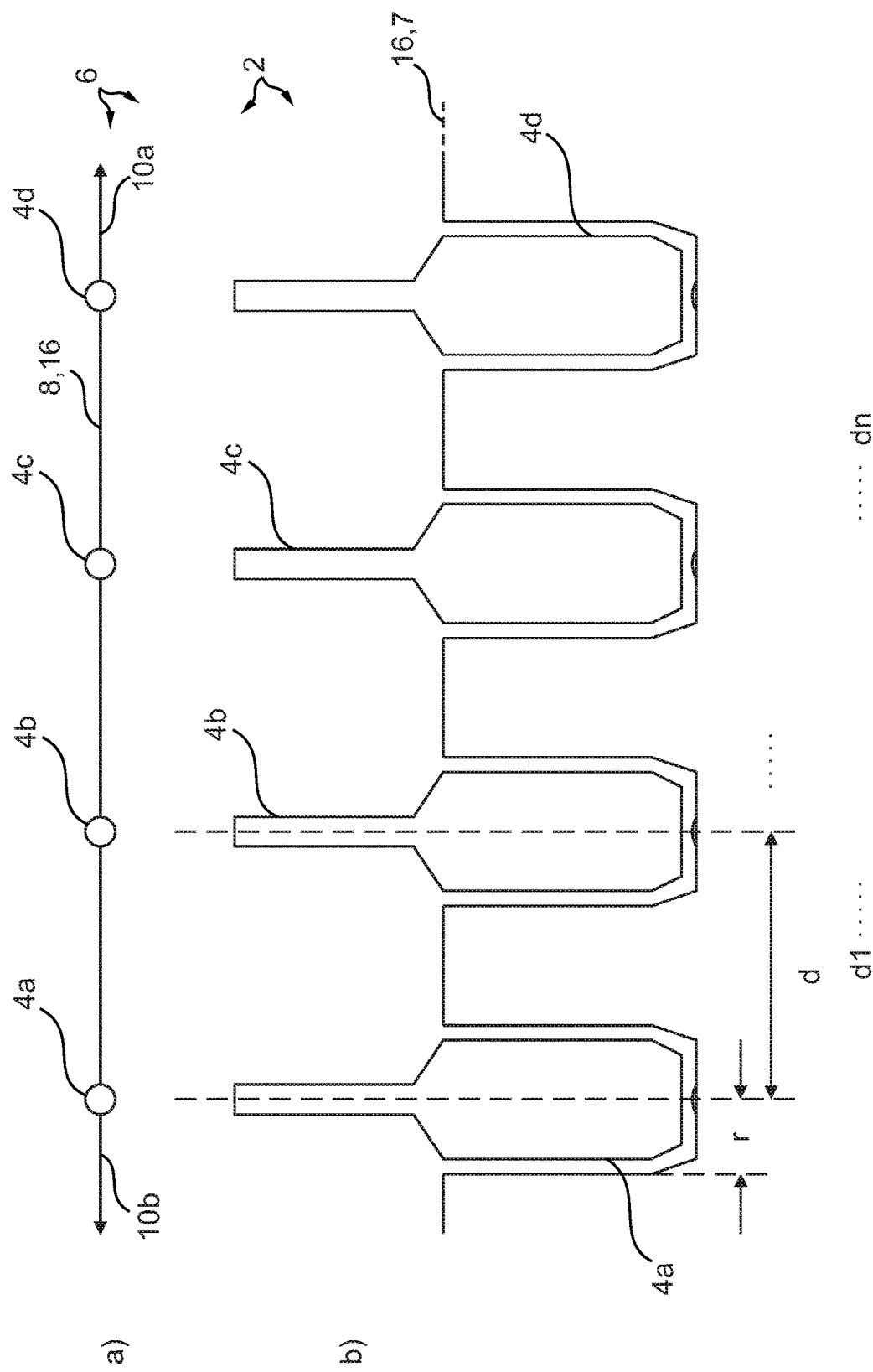
FIG. 1 shows a group of four antennas, with part a) being a top view, and part b) being a side view.

Referring now to the figures of the drawing in detail and first, particularly, to FIG. 1 thereof, there is shown a part of an HPEM source 2 in the form of an HPEM-DS directional antenna system. In the exemplary view, the system has a number N of antennas, by way of example N=4, namely, antennas 4a, 4b, 4c, and 4d. Each antenna 4a-d is an HPEM resonator antenna. The four antennas 4a-d are combined into a group 6 and are placed in a fixed position relative to one another. Here, the antennas 4a-d are lined up along a straight line 16. All antennas 4a-d are furthermore located in a common plane 7. A main direction 8 (also referred to as the "main beam direction") is assigned to the group 6. Here, the main direction 8 has a forward direction 10a and a backward direction 10b. The antennas 4a-d have the distances d or d1 do between them. On the whole, DS resonators in a serial arrangement in a line are involved here.

Figure 2:
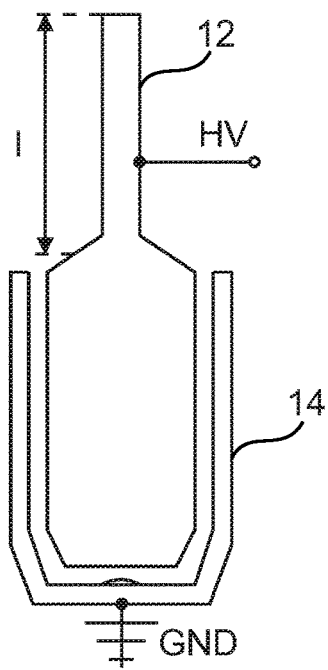
FIG. 2 is an elevation view showing in detail an antenna from the group of FIG. 1.

FIG. 2 shows the detailed diagram for one of the same DS resonator antennas (dipole/monopole) from FIG. 1. This antenna contains a resonator rod 12 which can be supplied with a high voltage HV, and around half of it is accommodated in a ground trough 14 connected to ground GND so that a section having a length l (effective antenna length) of the resonator rod 12 protrudes from the ground trough 14. The ground trough 14 has a radius r.

In one design example, the following applies:

$$d, l \approx n * \frac{\lambda}{4}$$

$$2 * r \leq d_n \geq \approx m * \frac{\lambda}{4}$$

where m, n=1, 2, . . . N, d1=d2= . . . =dn or/and d1≠d2≠ . . . ≠dn.

Figure 3A:
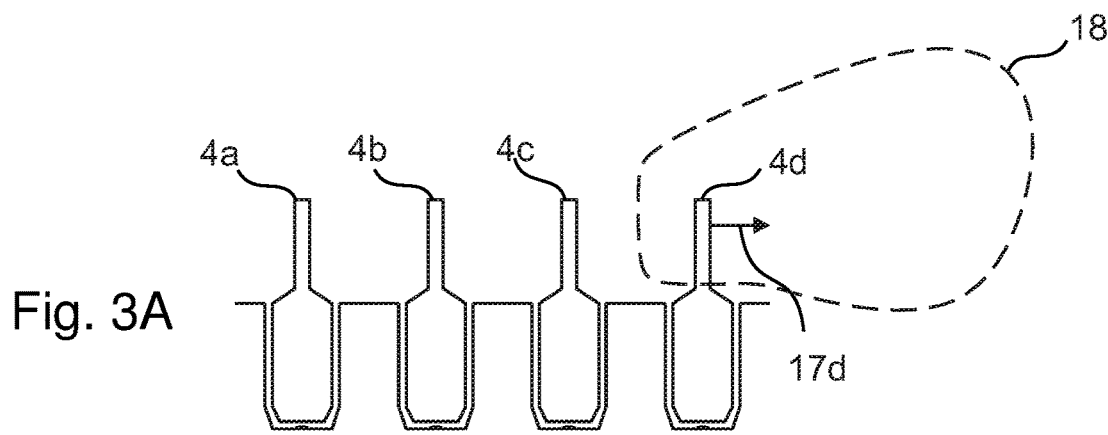
FIG. 3A is a smaller scale schematic view of the group from FIG. 1 in operation with one active antennas for the generation for HPEM pulses.
Figure 3B:
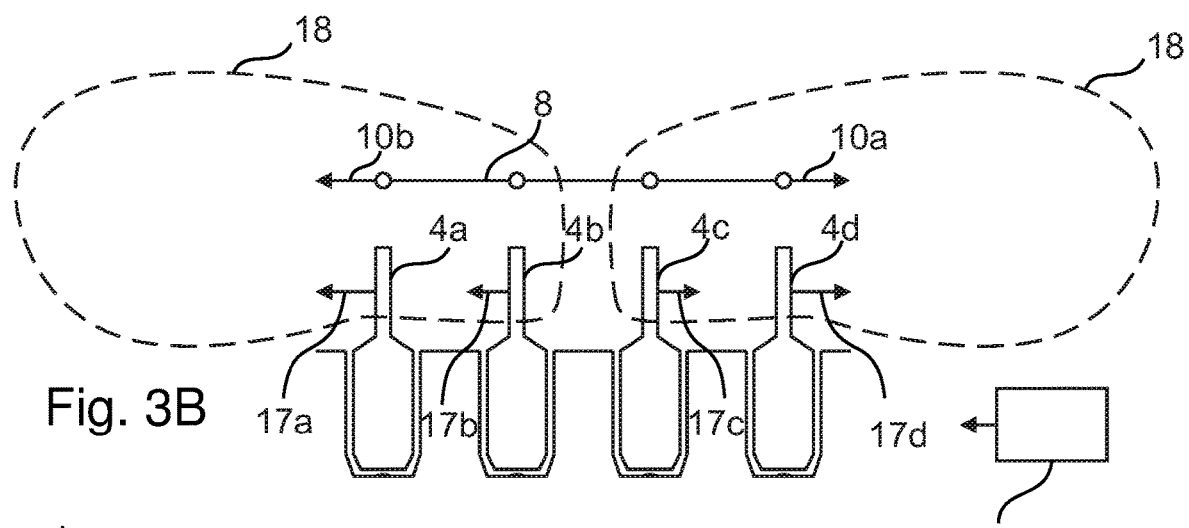
FIG. 3B is a similar view with four active antennas for the generation of two HPEM pulses.
Figure 3C:
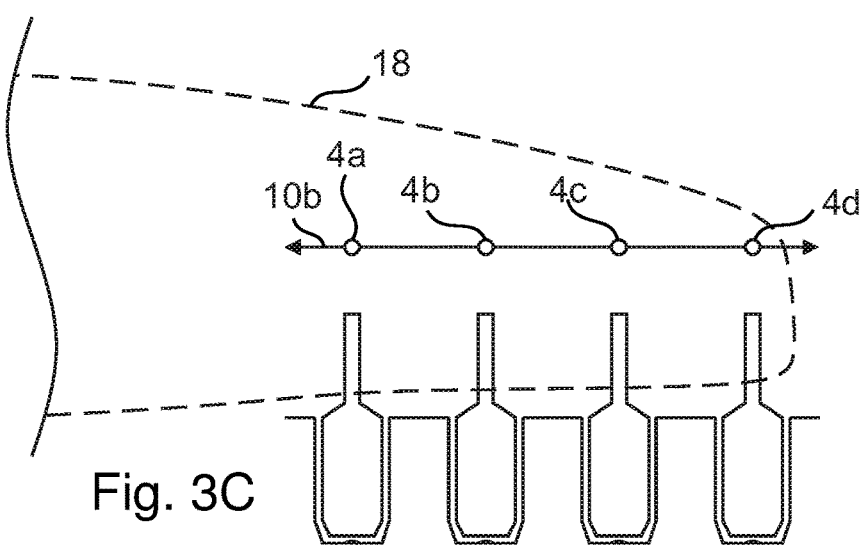
FIG. 3C is a similar view with four active antennas for the generation of one HPEM pulse.

FIGS. 3A-3C show the directional coupling of different configurations. In FIG. 3A, the antennas 4a-c are kept at no load as passive reflector elements. Only the antenna 4d is controlled with a phase of 0° (one resonator). This antenna emits a pulse component 17d which alone forms one HPEM pulse 18. The HPEM pulse 18 indicated only symbolically by dotted lines is thus produced. All antennas 4a-d are controlled by a control unit 15 indicated only symbolically here in FIG. 3B.

FIG. 3B (side view and top view) shows an alternative operation of the group 6 in which the antennas 4a-d are controlled in this sequence with phases of 0°, 90°, 90° and 0° (four resonators) and therefore emit four pulse components 17a-d which are superimposed on one another. Two HPEM pulses 18 are therefore produced in total, one of which is radiated in a forward direction 10a, the other in a backward direction 10b.

FIG. 3C finally shows the control or excitation/radiation of the antennas 4a-d in this sequence with phases of 0°, 90°, 180° and 270°. A directional pattern of the HPEM pulse 18 in a backward direction is produced as a result.

Figure 4:
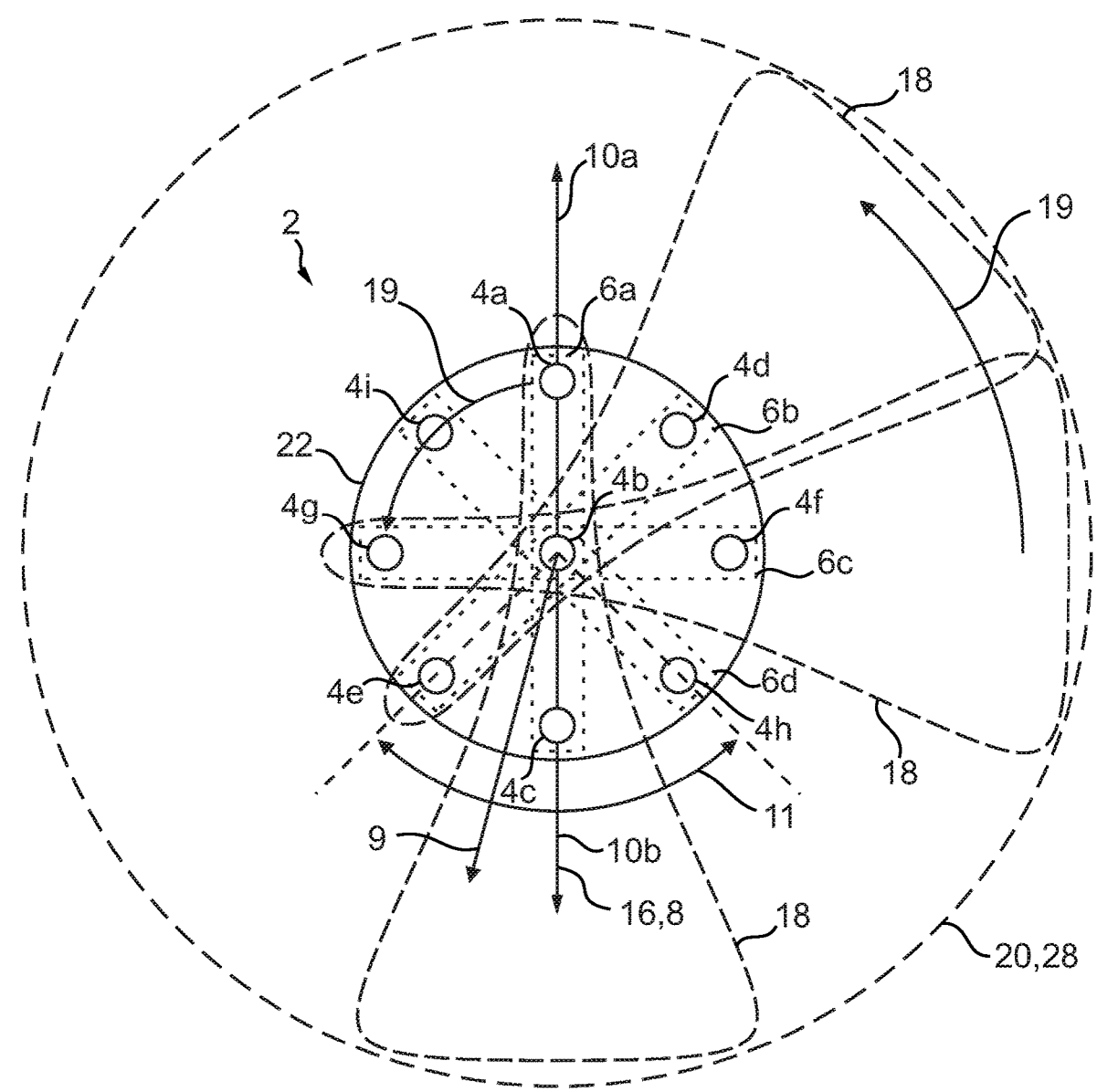
FIG. 4 shows one HPEM source with four groups in operation.

FIG. 4 shows a total HPEM source 2 with a total of nine antennas 4a-i which are organized into four groups 6a-d, in each case indicated by a dotted-line frame. The antennas 4a-i are mounted in a fixed position on a (here circular) support 22. In all groups 6a-d, the antennas are again disposed equidistantly along a respective straight line 16 which forms the respective main direction 8 (shown for group 6a only). In each of the groups 6a-d, one, two or three of the antennas 4 can alternatively again be active, while the remaining antennas are kept at no load as resonators.

The arrows 19 illustrate how a respective HPEM pulse 18 can be emitted in different directions through purely electronic switchover of the operation of the groups from 6a to 6c on the one hand and from 6c to 6b on the other hand. An all-round coverage can be provided within the dotted-line circumference 20 of the HPEM source 2 through the use of all four groups 6a-d and their respective operation in a forward direction 10a or backward direction 10b. The circumference 20 thus forms the coverage area 28 of the HPEM source 2.

Through alternative control of the antennas 4, the HPEM pulse can be emitted in a radiation direction 9 which deviates in an angle area 11 (here±45°) from the main direction 8.

The area or the limits are symbolized by a double arrow and dotted lines. This is done through purely electronic/electrical modification of the control of the antennas 4, i.e. the amplitudes and/or phase relationships between the antennas 4 involved.

Figure 5B:
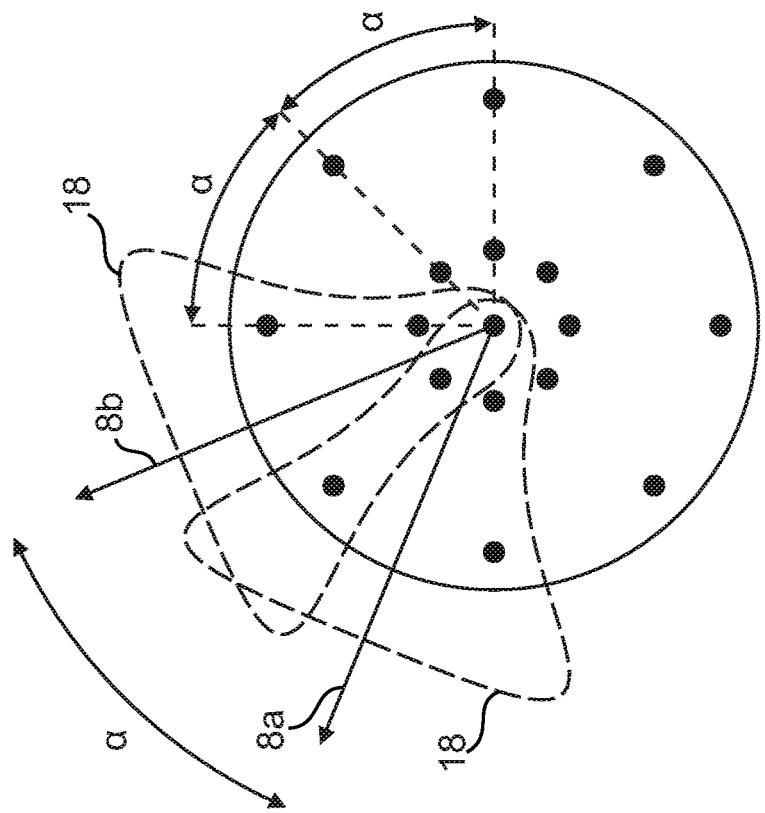
FIG. 5B is a similar view with five antennas in operation.
Figure 5A:
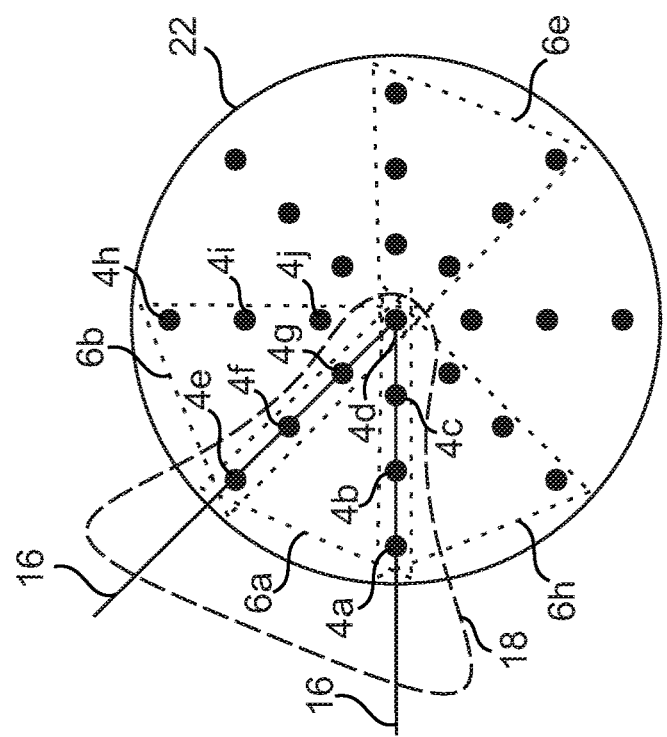
FIG. 5A shows one HPEM source with eight groups comprising seven antennas in operation.

FIG. 5A shows an alternative HPEM source 2 with 25 antennas 4a-"N" (the index is to be understood symbolically, N=25), of which only the antennas 4a-j are indicated. The antennas 4 are organized into a total of eight groups 6a-h. Each group 6a-h contains seven antennas 4. The antenna 4d is common to all groups. The groups 6a, b have the antennas 4e-g in common, the groups 6b, c have the antennas 4h-j in common, etc. The groups 6h and 6a have the antennas 4a-c in common. In this example, a combination in each case of two linear groups of antennas is therefore performed to extend the radiation range or directional pattern. The antenna 6d can be operated here as an active element or as a passive reflector element. The beam tracking is performed here also through switchover between antenna rows or groups 6 or through varying control of the antennas 4. The groups are disposed within circle segments with an aperture angle of 45°, and in each case on the (outer) radii or straight lines 16 of the segment which are limiting in the circumferential direction.

FIG. 5B shows a simplified variant of FIG. 5A, in each case with only three instead of four antennas 4 per radial row. However, the group organization corresponds in principle to that shown in FIG. 5a, but here with five antennas 4 per group 6. FIG. 5B again illustrates how a switchover between the groups 6a, b also pivots the respective beam direction 9 from the main direction 8a to the main direction 8b through an angle α of, here, 45°. This also corresponds to the angle offset between two adjacent radial groups of antennas 4, as shown in FIG. 5B.

Figure 6:
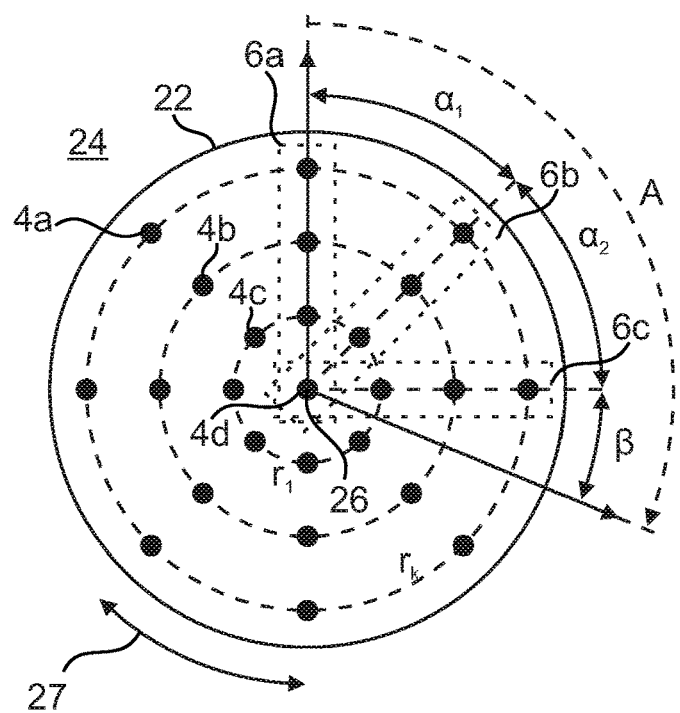
FIG. 6 shows the HPEM source from FIG. 5A with a combination of electronic and mechanical tracking.

FIG. 6 once more shows the basic arrangement from FIG. 5A, wherein the support 22 is rotatable here in relation to a foundation 24 around an axis of rotation 26 at the location of the antenna 4d. The pivoting capability extends here to a pivot range 27 of 45°. The antennas 4 are furthermore organized into eight alternative groups 6a-j, each comprising four antennas. A combination of electronically and mechanically controlled tracking of the main (beam) direction 8 is thus enabled for better target acquisition. In the example, the main direction 8 is intended to be pivoted through the rotation angle A of 120°.

Through switchover from the group 6a to the group 6c, an angle change of twice 45° (α1 and α2) takes place. In addition, a mechanical twisting of the support 22 takes place around the axis of rotation 26 through the pivot angle β, here 30°. The following relationships apply: N=8 is the number of groups 6 and therefore of angle segments of the angles α1, 2, ... K=3 is the number of different radii of the antennas 4 to the axis of rotation 26. Here, α1=α2= ... =αN applies. Alternatively, example embodiments (not shown) where α1≠α2≠ ... ≠αN would also be possible, wherein α1≤ or ≥α2 ... αn can apply. For the rotation angle β, ½ αn≤β≤αn applies, where n=1 ... N. For the radii rk where k=1 ... K, rk=k*r1 applies, where r1≤r2 ... ≤rk. The rotation angle A of the main direction 8 or of the main beam for α1=α2= ... =αN and rk=k*r1, where n=1 ... (N−1), results as $$A = (n-1) * \alpha_1 \pm \beta$$

The first addend forms the electronic component and the second addend (β) forms the mechanical component.

Figure 7:
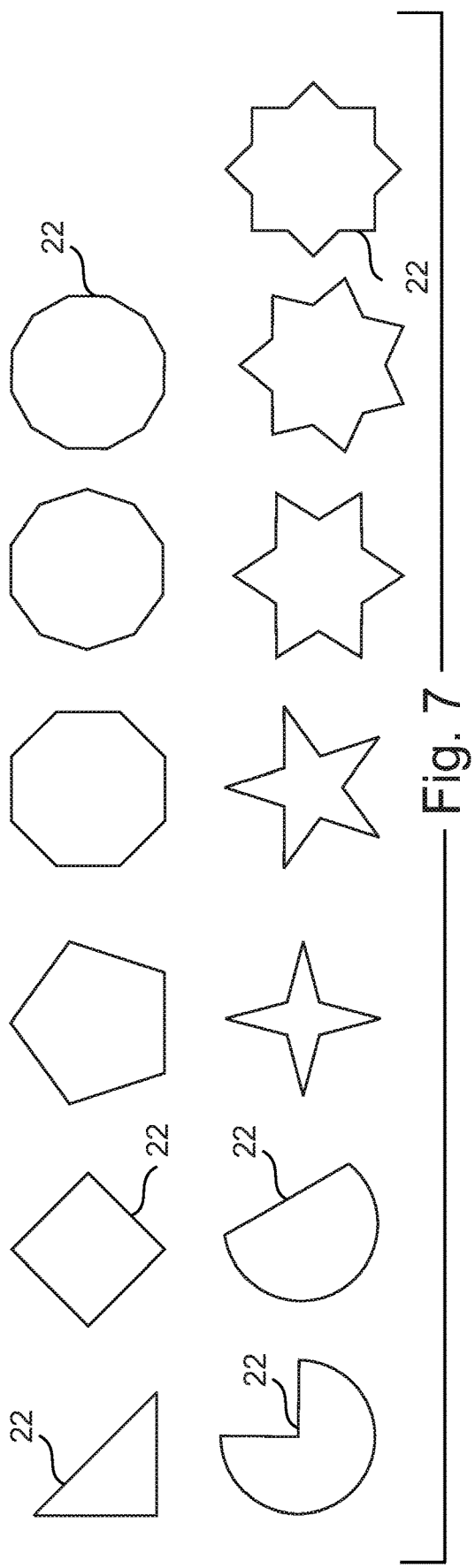
FIG. 7 shows various shapes of ground planes.

FIG. 7 shows eight different polygons with 3, 4, 5, 8, 10 and 12 sides, two circle segments and five stars with 4, 5, 6, 7 and 8 angles or points. All these shapes can serve as shapes for supports 22, in order to fit any given arrangements of antennas 4 thereon.

Figure 8C:
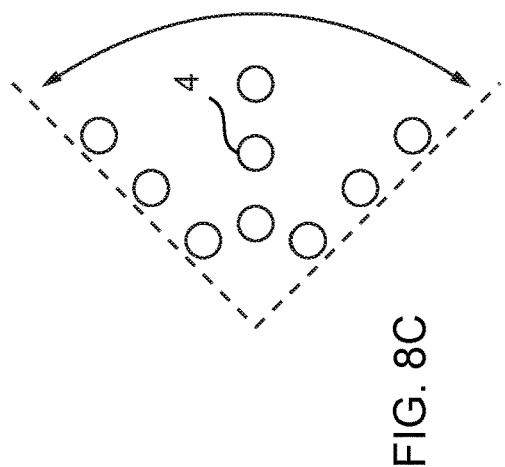
FIGS. 8A, 8B, and 8C show different antenna arrangements.
Figure 8B:
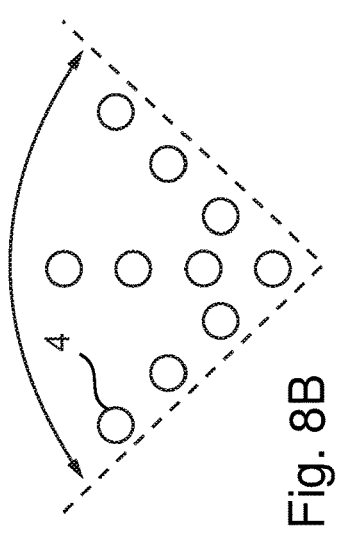
Figure 8A:
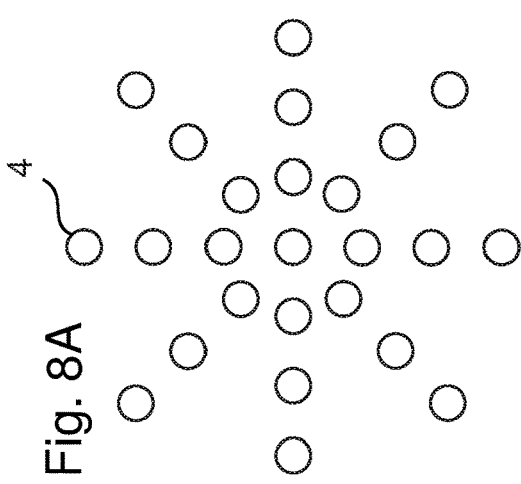

FIGS. 8A, 8B, and 8C show three possible arrangements 4, namely, FIG. 8A shows the arrangement from FIGS. 5A and 6, and FIG. 8B shows a circle-segment-shaped arrangement of three straight lines with ten antennas, and FIG. 8C shows a comparable arrangement with nine antennas, in which the common central antenna is omitted. As shown above, the arrangement FIG. 8A is suitable for all-round coverage, variants FIGS. 8B and 8C for the coverage of a segment approximately 90° in size (indicated by double arrows) on the basis of purely electronic pivoting of the main direction 8.

FIGS. 8A, 8B, 8C therefore illustrates how angular designs or different designs of the ground plane and the antenna configurations which are favorable in terms of radiation technology are possible. Only examples of some possible subsegments and antenna groups are shown. The control of the individual subsegments and antenna groups is determined by the requirements of the coverage area and may differ greatly.

Figures 9A, 9B:
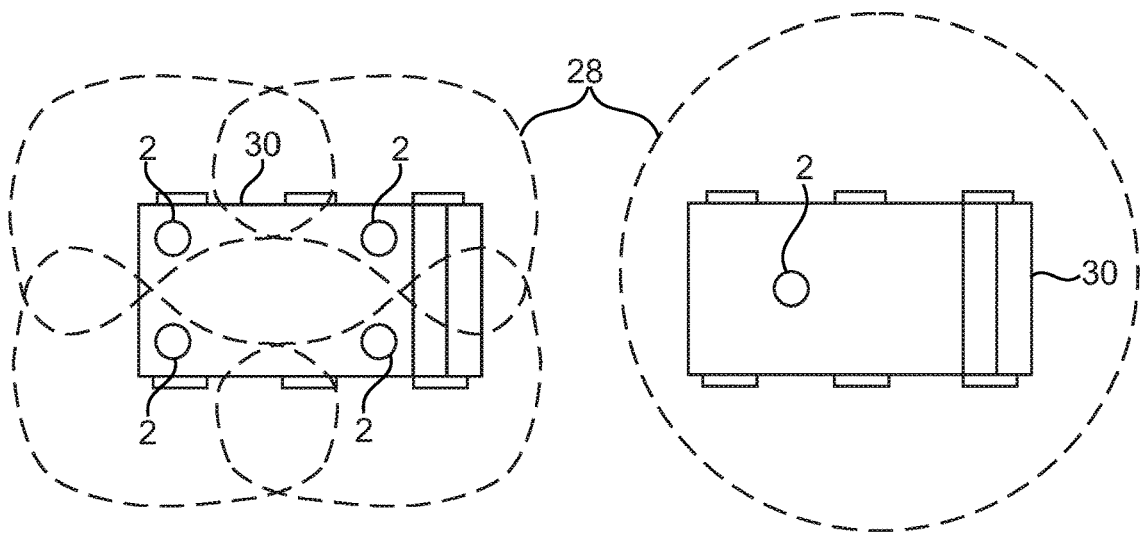
FIG. 9A is a schematic top view showing a vehicle with four HPEM sources.
FIG. 9B is a similar view with one HPEM source.

FIGS. 9A and 9B show integration examples for the implementation of a 360° coverage. The respective coverage areas 28 are indicated by dotted lines. FIG. 9A shows a vehicle 30 in a top view with a total of four HPEM sources 2 which in each case are mounted in a fixed position on the vehicle roof. This is an example of a 360° coverage on a vehicle 30 with a plurality, here four, of systems (HPEM sources 2). Specific areas can be eliminated or their effect can be increased by restricting the effective areas of the individual systems (eight HPEM sources 2).

Conversely, FIG. 9B shows an individual system (a single HPEM source 2) with 360° coverage. The support 22 is pivotally mounted on the vehicle 30 which therefore forms the above-mentioned foundation 24.

Figure 10:
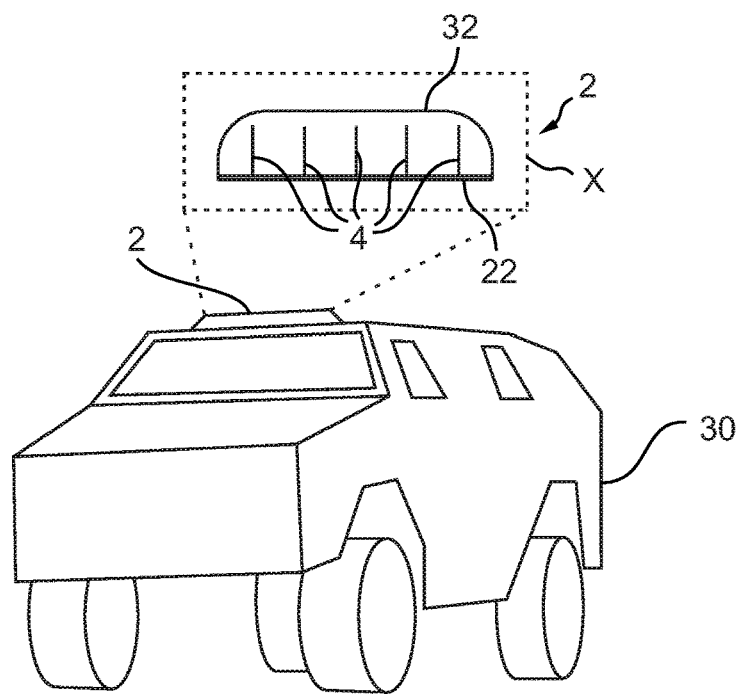
FIG. 10 is a perspective view of the vehicle from FIG. 9B.

FIG. 10 shows the vehicle 30 from FIG. 9B in a perspective view. The representation "X" shows the HPEM source of the vehicle 30 enlarged in detail in cross section. The antennas 4 (resonator rods/antenna rods) are protected under a protective casing 32.

Figure 11:
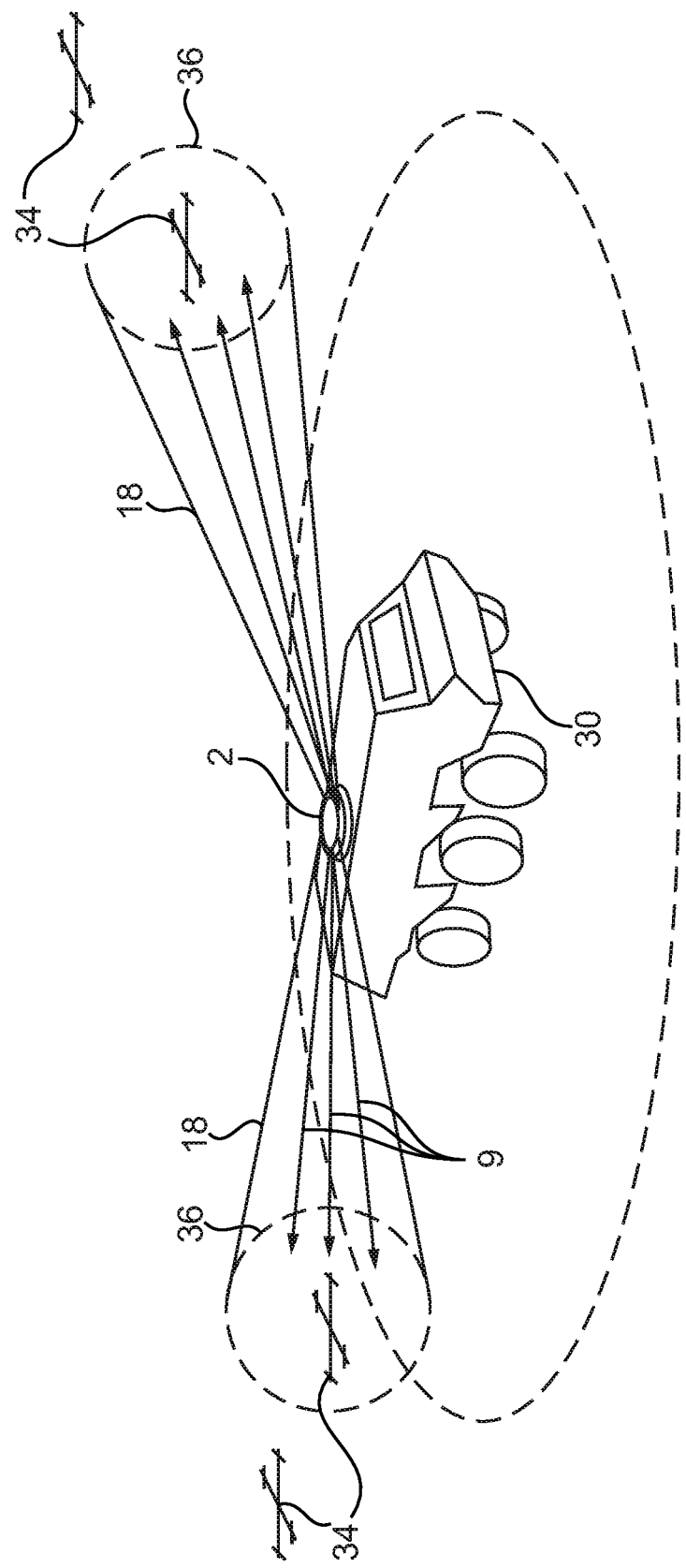
FIG. 11 is a perspective, schematic view showing an alternative vehicle with an HPEM source in operation.

FIG. 11 shows an alternative vehicle 30 with the HPEM source 2 as an HPEM directional antenna system. The all-round protection of the vehicle 30 is illustrated by the arrows shown. Any threats 34 (here mini-drones) can be averted by aligning the HPEM pulses 18 of the current radiation direction 9 with detected target areas 36. The vehicle 30 is thus protected against the mini-drones.

The following is a list of reference numerals and symbols and the corresponding elements as described in the above specification:
2 HPEM source
4, 4a-n Antenna
6, 6a-d Group
7 Plane
8 Main direction
9 Radiation direction
10a, 10b Forward/backward direction
11 Angle range
12 Resonator rod
14 Ground trough
15 Control unit
16 Straight line
17, 17a-d Pulse component
18 HPEM pulse
19 Arrow
20 Circumference 22 Support
24 Foundation
26 Axis of rotation
27 Pivot range
28 Coverage area
30 Vehicle
32 Protective casing
34 Threat
36 Target area
HV High voltage
GND Ground
l Length
d,d1-$n$ Distance
r Radius
α Angle
β Pivot angle
A Rotation angle

The invention claimed is:

1. A high-power electromagnetic (HPEM) source for emitting an HPEM pulse in a given radiation direction, the HPEM source comprising:
    at least three antennas fitted at fixed positions relative to one another and each configured to emit a respective pulse component;
    at least two of said antennas being combined in each case into a group, forming at least two groups of antennas which differ from one another in terms of at least one antenna;
    each of said groups of antennas having one main direction assigned thereto, and said antennas being configured to define at least two different main directions; and
    a control unit configured to control said antennas in terms of an activation of a phase position of respective pulse components thereof in such a way that the pulse components of said antennas are superimposed on one another in an HPEM pulse for at least one of said groups, wherein a current radiation direction of the HPEM pulse is selectable in a specific angle range around the main direction, with the specific angle range being less than 360°.

2. The HPEM source according to claim 1, wherein all of said at least three antennas are arranged in a common plane.

3. The HPEM source according to claim 1, wherein all of said antennas of at least one of said groups are arranged along a straight line, and the straight line is the main direction.

4. The HPEM source according to claim 3, wherein said at least one of said groups is one of at least two groups and at least two of the respective straight lines are different diameter lines of an imaginary circle, and wherein the antennas of a respective said group are distributed along the straight lines on one radius or on an entire diameter.

5. The HPEM source according to claim 1, wherein all antennas of at least one of said groups are arranged within a circle segment with an aperture angle no greater than 180°.

6. The HPEM source according to claim 5, wherein the circle element is bounded by limiting radii, and said antennas are arranged exclusively along two straight lines and the two straight lines represent the limiting radii of the circle segment.

7. The HPEM source according to claim 1, wherein, for at least one of said groups, mutually adjacent antennas of said group are spaced at equal spacing distances therebetween.

8. The HPEM source according to claim 1, wherein said control unit is configured to maintain at least one of said antennas operating at no load as a passive reflector antenna.

9. The HPEM source according to claim 1, further comprising a support, wherein all antennas are mounted in a fixed position on said support and said support is pivotable in relation to a foundation within a pivot range of less than 360° and said controller is configured to control a current pivot range of said support relative to said foundation.

10. The HPEM source according to claim 9, wherein the pivot angle is half of a greatest of the angle ranges.

11. The HPEM source according to claim 9, wherein said support has a basic shape of an N-sided figure or a star with N points, where N>2, or of a circle segment.

12. A vehicle, comprising at least one HPEM source according to claim 1 and having said antennas mounted in a fixed position on the vehicle.

13. The vehicle according to claim 12, further comprising:
    a support pivotally mounted on the vehicle;
    wherein all antennas are mounted in a fixed position on said support and said support; and
    said support is pivotable in relation to the vehicle within a pivot range of less than 360° and said controller is configured to control a current pivot range of said support relative to said vehicle.

14. The vehicle according to claim 12, wherein:
    said at least one HPEM source is one of at least two HPEM sources mounted on the vehicle and the main directions, including the angle ranges, cover only a respective total angle of less than 360° for each of said at least two HPEM sources.

15. A method for emitting a high-power electromagnetic (HPEM) pulse in a desired radiation direction, the method comprising:
    providing at least three antennas fitted in a fixed position relative to one another and each configured for emitting a respective pulse component;
    combining at least two of the antennas each into a group, and providing at least two groups of antennas which differ from one another in terms of at least one antenna;
    assigning to each of the groups one main direction and thereby providing at least two different main directions; and
    controlling all antennas in terms of activation and phase position of the respective pulse component such that, for one of the groups, the pulse components of the antennas are superimposed on one another for the HPEM pulse, wherein the current radiation direction of said pulse is selected in a specific angle range around the main direction, wherein the angle range is less than 360°.

* * * * *